United States Patent
Steed, Jr. et al.

(10) Patent No.: US 7,877,073 B2
(45) Date of Patent: Jan. 25, 2011

(54) SUPERHETERODYNE RECEIVER HAVING AT LEAST ONE DOWNCONVERSION STAGE EMPOLYING A SINGLE IMAGE REJECT FILTER STAGE AND BOTH LOW-SIDE INJECTION AND HIGH-SIDE INJECTION OF A LOCAL OSCILLATOR SIGNAL

(75) Inventors: David C. Steed, Jr., American Fork, UT (US); Martin R. Johnson, Draper, UT (US)

(73) Assignee: Digi International Inc., Minnetonka, MN (US)

( * ) Notice: Subject to any disclaimer, the term of this patent is extended or adjusted under 35 U.S.C. 154(b) by 840 days.

(21) Appl. No.: 11/203,473

(22) Filed: Aug. 11, 2005

(65) Prior Publication Data

US 2007/0037546 A1     Feb. 15, 2007

(51) Int. Cl.
*H04B 1/18*     (2006.01)
(52) U.S. Cl. ............. 455/293; 455/189.1; 370/478
(58) Field of Classification Search ............ 455/293
See application file for complete search history.

(56) References Cited

U.S. PATENT DOCUMENTS 6,487,219 B1 * 11/2002 Snider ................. 370/478

* cited by examiner

*Primary Examiner*—Duc Nguyen
*Assistant Examiner*—Ajibola Akinyemi
(74) *Attorney, Agent, or Firm*—Angus C. Fox, III (57) ABSTRACT

A multi-channel superheterodyne receiver employs a low intermediate frequency (IF) and both high-side injection and low-side injection of a selected local oscillator (LO) signal into the mixer in order to position image frequencies outside the passband of a single image reject filter. Any channel that falls within a used portion of the image reject filter passband can be downconverted with image rejection if the utilized bandwidth portion is no greater than about 4 times the IF minus the bandwidth of a channel in the filter passband. Low side injection is used for channels falling within the lower half of the passband of the image reject filter, while high-side injection is used for channels falling within the upper half thereof. The image always remains outside the passband and the receiver can accommodate a greatly increased number of channels.

16 Claims, 4 Drawing Sheets

SUPERHETERODYNE RECEIVER HAVING AT LEAST ONE DOWNCONVERSION STAGE EMPOLYING A SINGLE IMAGE REJECT FILTER STAGE AND BOTH LOW-SIDE INJECTION AND HIGH-SIDE INJECTION OF A LOCAL OSCILLATOR SIGNAL

FIELD OF THE INVENTION

The present invention relates to multi-channel superheterodyne radio receivers and, more particularly, to the processes of generating an intermediate frequency using a local oscillator and a mixer and the attenuation of resulting image frequencies using an image reject filter.

BACKGROUND AND RELATED ART

Figure 1:
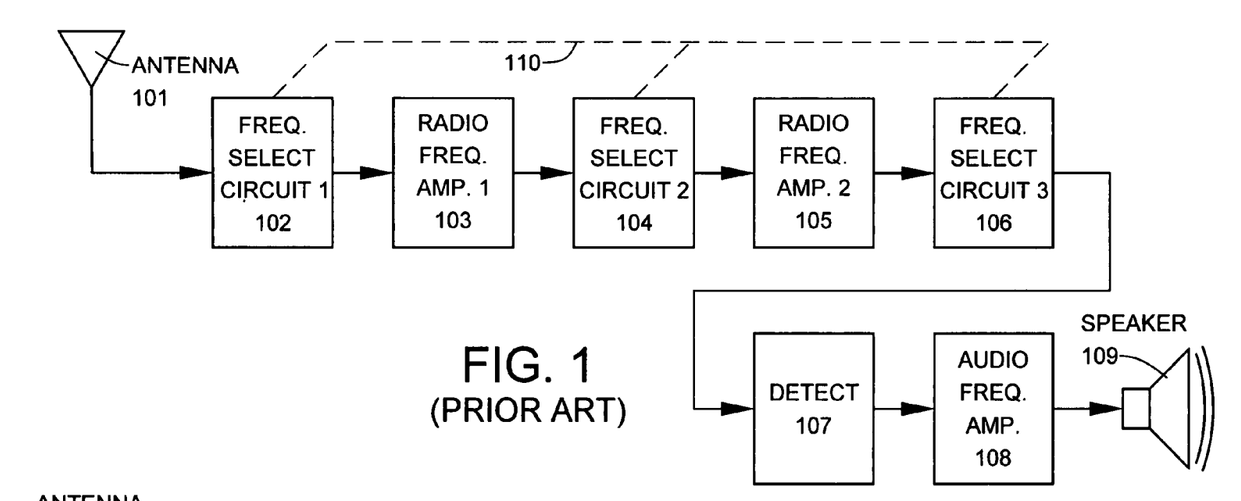
FIG. 1 is a block diagram of a TRF receiver.

Tuned radio frequency (TRF) receivers were developed during the second decade of the twentieth century and patented by Ernst Alexanderson in 1916. FIG. 1 is a block diagram of a typical TRF receiver having an antenna 101 which provides radio frequency signals to a first tank or frequency select circuit 102, which provides a selected RF signal to a first RF amplifier 103. The amplified output of the first RF amplifier 103 is received by a second tank or frequency select circuit 104, which provides the selected and amplified RF signal to a second RF amplifier 105. The further amplified RF signal is received by a third tank or frequency select circuit 106, which provides the selected and further amplified RF signal to a detector 107, which demodulates the further amplified RF signal to produce an audio signal, which is sent to an audio frequency amplifier 108, and then to a speaker 109. The basic principle of the TRF receiver is that all tank (i.e., frequency selection circuits) are simultaneously tuned to the received frequency before detection and subsequent amplification of the audio signal. The dashed line 110 represents the ganging of the tuning capacitors of the three frequency selection circuits 102, 104 and 106. There are two significant disadvantages to the TRF receiver design. The first disadvantage is that selectivity is inconsistent over its tuning range. The receiver's ability to reject unwanted signals received by the antenna is a function of the receiver's selectivity. The second disadvantage is that it is difficult to make the multiple ganged stages track so that all change frequency by the same amount simultaneously. Consequently, most TRF receivers were equipped with multiple tuning knobs so that the frequencies of the tank circuits could be precisely tuned after an initial rough tuning.

Figure 2:
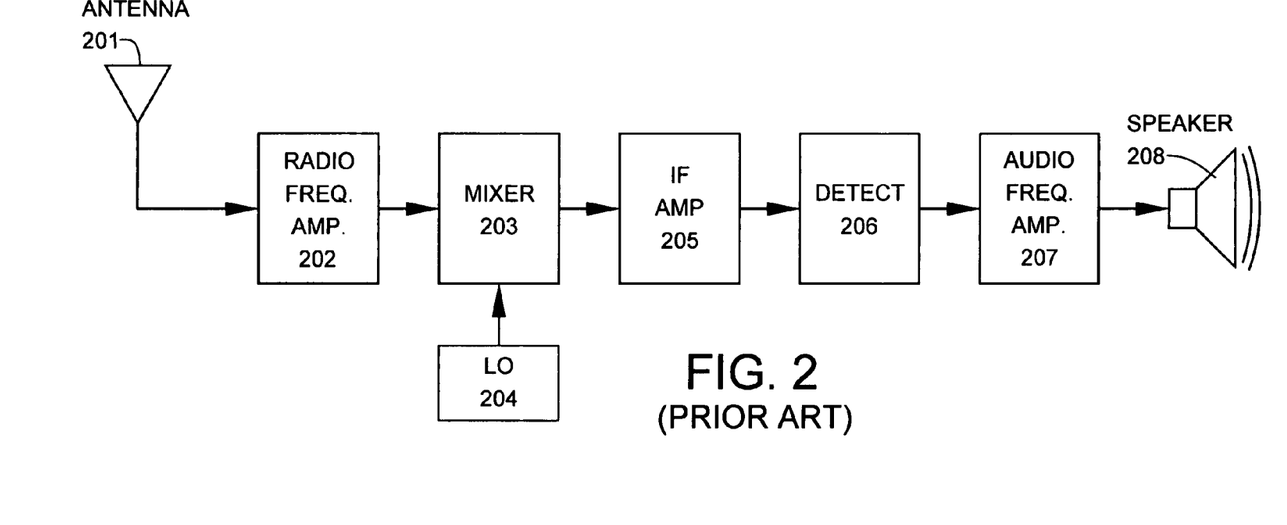
FIG. 2 is a block diagram of a superheterodyne receiver.

In 1919, Edwin Armstrong developed the superheterodyne (also called super-sonic heterodyne or, simply, superhet) receiver, which was not beset by the disadvantages of TRF receiver cited above. FIG. 2 is a block diagram of a typical superheterodyne receiver. Radio frequency signals are received from an antenna 201 by a radio frequency amplifier 202. A mixer 203 receives amplified RF signals from the radio frequency amplifier 202 and a local oscillator signal from a local oscillator 204. The essential difference between a TRF receiver and a superheterodyne receiver is that in the former, the RF amplifiers preceding the detector are tunable over a band of frequencies, whereas in the latter, the corresponding amplifiers are tuned to a single fixed frequency called the Intermediate Frequency (IF). The IF is produced by the mixer 203, which combines the incoming RF signals with a signal generated by the local oscillator (LO) 204 at a frequency that will produce the IF. Thus, a desired incoming RF of known frequency is selected by choosing an LO signal of appropriate frequency. In this process, known as heterodyning, the two signals combine to produce an output beat frequency that is equal to the sum or difference of the original frequencies. The following relationship always holds true: the Intermediate Frequency (IF) is equal to the absolute value of the desired radio frequency (RF) minus the local oscillator (LO) frequency. If LO is greater than RF, this is termed high-side injection. If LO is less than RF, this is termed low-side injection. Through heterodyne action, any desired frequency within the receiver range may be converted to the intermediate frequency. The resultant beat frequency, which is at the IF, is sent to an intermediate frequency amplifier and filtering stage 205. The amplified and filtered IF signal is then sent to a detector 206, which demodulates the signal to produce an audio signal, which is sent to an audio frequency amplifier 207. An amplified audio frequency signal is then sent to a speaker 208. Thus, an incoming signal is converted to the fixed intermediate frequency before detecting the audio signal component, and the IF amplifier and filtering stage 205 operates under uniformly optimum conditions throughout the receiver frequency range. In a superheterodyne receiver, the IF circuits may be made uniformly selective, high in voltage gain, and of satisfactory bandwidth to contain all of the desired sideband components associated with a modulated carrier. Since the IF stages operate at a single frequency, a superheterodyne receiver may be designed to have better selectivity and sensitivity across the entire broadcast band and better gain per stage than a TRF receiver. Although a superheterodyne receiver typically contains more tuned stages than a TRF receiver, the majority of the stages are tuned to a single, fixed, intermediate frequency. This reduces the tracking problem and makes alignment of the tuned stages much easier. Unfortunately, sideband ambiguity inherent in the mixing stage of the superheterodyne receiver causes two closely related problems: double spotting and the reception of image frequencies.

"Double spotting" is a term which means that a desired station may be tuned in at two different selected frequencies. An image is an undesired IF intermediate frequency containing spurious information from a transmission on an unselected frequency. Rodney Champness, an Australian amateur radio enthusiast, clearly explains double spotting and image generation in Issue 171, titled Intermediate Frequency amplifiers, of his Internet publication, *Vintage Radio*.

Figure 3:
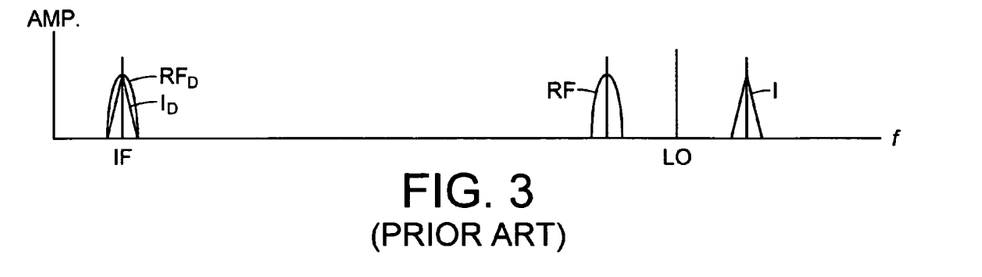
FIG. 3 is a plot of amplitude vs. frequency for a receiver having no preselection of a desired frequency prior to the mixing stage.

Mr. Champness uses the example of a superheterodyne receiver having an IF amplifier that operates at a frequency of 30 kHz. The local oscillator frequency must therefore be offset from the frequency of a desired station by the IF. As high-side injection is typically standard practice, if the desired station is transmitting at 800 kHz, the local oscillator will be tuned to 800+30=830 kHz. However, because selectivity of the RF stage of the receiver is generally not absolute, a station at a frequency of 860 kHz will also provide a 30 kHz IF output when mixed with a local oscillator frequency of 830 kHz. In the first case, the desired IF is generated by high-side injection; in the latter case, an undesired IF is generated by low-side injection of another RF signal at a different frequency in the RF reception band. This other RF signal is called the "image" because it and the desired signal are mirrored about (i.e., on opposite sides of and equidistant from) the LO signal frequency. If the undesired IF signal has a magnitude approaching that of the desired IF signal, it may jam or interfere with the latter. The amplitude vs. frequency plot of FIG. 3 shows the LO frequency, the desired signal's spectrum (RF) immediately to the left of the LO frequency, the undesired signal's spectrum (I) to the right of the LO frequency, and the resultant downconverted IF spectra at the far left after the downconversion mixing process. The downconverted desired signal ($RF_D$) is superimposed on the downconverted image signal ($I_D$).

To continue Mr. Champness' example, if the receiver is now tuned to 740 kHz, the oscillator will be on 770 kHz. However, this will also give a 30 kHz IF output from the 800 kHz station. Once again, we are dealing with high-side and low-side injection phenomena. This means that the 800 kHz station may be heard at both the 800 kHz and 740 kHz positions on the dial.

Figure 4:
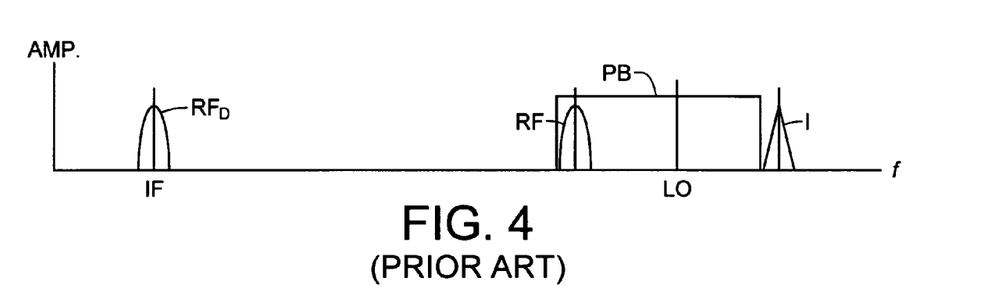
FIG. 4 is a plot of amplitude vs. frequency for a receiver having an effective image reject filter prior to the mixing stage.

Given the fact that there are two RF signals that are frequency translated, or downconverted, to the IF by the mixer, it is desirable to filter out the undesirable frequency before it gets to the mixer so that it will not be frequency translated, or downconverted, to the IF frequency where it can jam or interfere with the desired signal. This is typically accomplished using what is called an image reject, or preselection, filter. Though the image reject filter is generally unable to completely eliminate the image signal, a properly designed filter will attenuate the image signal to a level where it does not cause appreciable interference with the desired signal at the IF after downconversion has taken place. The amplitude vs. frequency plot of FIG. 4 shows the LO frequency, the desired signal's spectrum (RF) immediately to the left of the LO frequency, the undesired signal's spectrum (I) to the right of the LO frequency, a bandpass filter having a passband (PB) represented by the window which encompasses both the desired signal spectrum (RF) and the LO frequency, and the downconverted IF spectrum ($RF_D$) after the mixing stage. It will be noted that no downconverted image spectrum is present.

Figure 5:
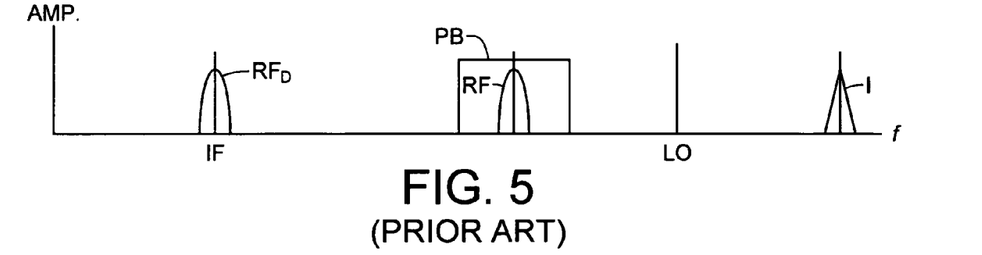
FIG. 5 is a plot of amplitude vs. frequency for a receiver having a relatively high IF, thereby enhancing image rejection at the expense of channel selectivity.
Figure 6:
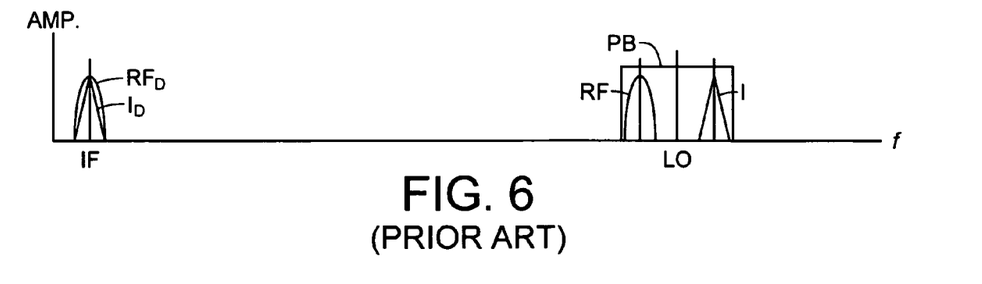
FIG. 6 is a plot of amplitude vs. frequency for a receiver having a relatively low IF, thereby enhancing channel selectivity at the expense of image rejection.

There are two competing design goals which mandate a compromise in the design of conventional superheterodyne receivers: that of facilitation of image rejection and that of channel selectivity. FIGS. 5 and 6 demonstrate how each design goal interferes with the other. In order to facilitate image rejection by the image reject filter, it is desirable to have a large frequency separation between the image frequency and the desired signal frequency. Clearly, if the image frequency and the desired signal frequency are too close to one another, then suitable image reject filter requirements may be unachievable, as the Q of the bandpass filter would be unrealistically large. Q is the Quality Factor of a bandpass or notch filter, and it is defined as the center frequency of the filter divided by the bandwidth. The bandwidth is defined as the frequency of the upper 3 dB roll-off point minus the frequency of the lower 3 dB roll-off point. Although one would initially suspect that the Q of a bandpass filter could be increased indefinitely, this is simply not the case. Although an in-depth discussion of bandpass filters is outside the scope of this discussion, a brief discussion is in order. Although the bandpass of the image reject filters of FIGS. 4 through 14 is depicted as a doorway having vertical ("brickwall") side limits, this is only a convenient graphic representation that does not accurately represent the bandpass characteristics of real-world bandpass filters. As a practical matter, a single stage bandpass or notch filter is not uniformly effective over the entire bandwidth. As one might deduce from the above definition of Q for a bandpass or notch filter, the filter passband is most accurately represented as a bell-shaped curve. Thus, signals having frequencies near the center of the curve are passed most effectively, while those beneath the tails of the curve are partially attenuated. In order to construct a bandpass or notch filter having a bandpass approaching a rectangular, or brickwall, shape, it would be necessary to serially couple multiple filter stages. Another factor that needs to be considered with respect to bandpass filter shape is that of asymmetry. That is to say that instead of being a perfectly symmetrical bell curve, the passband curve may be shifted to either the right or left of center.

A large separation between the image frequency and desired signal frequency implies that the IF is large. The amplitude vs. frequency plot of FIG. 5 shows the LO frequency, the desired signal's spectrum (RF) well to the left of the LO frequency, the undesired, or image, signal's spectrum (I) well to the right of the LO frequency, a bandpass filter having a passband (PB) represented by the window which encompasses only the desired signal spectrum (RF), and the downconverted IF spectrum ($RF_D$) after the mixing stage, which is spaced well to the right of the origin. Once again, it will be noted that there is no downconverted image spectrum. However, the problem with this scenario is that adequate channel selection is difficult to achieve, as the IF stage filter would require an unrealistically high Q. In this case, image rejection is enhanced at the expense of channel selectivity.

The conventional approach to superheterodyne receiver design is to use either high-side injection (most common) or low-side injection of the LO signal exclusively. However, even when the bandwidth of the image reject filter is larger than the (RF-IM) frequency, it is not possible utilize the entire filter bandwidth for image rejection when using only low-side injection exclusively or only high-side injection exclusively.

FIG. 6 demonstrates what happens when the IF is set to a low value in order to facilitate the selection of a desired channel from adjacent channels by an IF filter in the IF stage of the receiver. Because a low IF value implies a narrow frequency separation between the image frequency and the desired signal frequency, in this case channel selectivity is enhanced at the expense of image rejection. The amplitude vs. frequency plot of FIG. 6 shows the LO frequency, the desired signal's spectrum (RF) barely to the left of the LO frequency, the undesired signal's spectrum (I) barely to the right of the LO frequency, a bandpass filter having a passband (PB) represented by the window which encompasses both the desired frequency spectrum (RF) and the image frequency spectrum (I). In this scenario, the mixing stage results in a downconverted desired frequency spectrum ($RF_D$), as well as a downconverted image frequency spectrum ($I_D$), leading to almost certain jamming and interference.

Consequently, many contemporary superheterodyne receiver designs use multiple downconversion stages, with each stage having an image reject filter, a mixer, a local oscillator and a stage-specific IF, or multiple image reject filters, each having a different passband that is much smaller than the (RF-IM) frequency, and switching between those multiple image reject filters as a function of the desired channel frequency.

In order to overcome problems associated with the two competing goals of enhancing channel selectivity and enhancing image rejection, manufacturers of contemporary superheterodyne receivers typically resort to the use of complex design architecture. One common approach is to use multiple (usually two) downconversion stages, with each stage having at least one image reject filter, a mixer, a local oscillator and a stage-specific IF. Another approach is to use a single downconversion stage with multiple independent image reject filters, each of which has a different passband that is much smaller than the (RF-IM) frequency. Complex switching circuitry is employed to select between the various image reject filters as a function of the desired channel frequency. The downside to increased product complexity is increased design, manufacturing and warranty costs.

What is needed is a simple and inexpensive superheterodyne receiver architecture having both channel selectivity and image rejection that is on par with that of more complex and costly superheterodyne receiver designs.

SUMMARY OF THE INVENTION

The need heretofore expressed for a simple and inexpensive multi-channel superheterodyne receiver architecture that improves both channel selectivity and image rejection is fulfilled with the present invention. This is accomplished by using a relatively low intermediate frequency (IF) and a novel approach to local oscillator (LO) frequency selection which causes image frequencies to fall outside the passband of a single image reject filter. If channel bandwidth is assumed to be zero and the passband of an image reject filter is assumed to be of rectangular, or of "brickwall," shape, then any channel that falls within the passband of the image reject filter will be downconverted with image rejection if the passband (PB) of the image reject filter is less than or equal to 4 times the IF. As a practical matter, channel bandwidth is never zero, a brickwall passband shape is unrealistic, and the curve which represents the filter passband may not even be symmetrical. Hence the image reject filter passband must be somewhat less than 4 times the IF for image rejection to occur across the entire passband. In order to maximize filter bandwidth, low-side injection of the local oscillator (LO) signal into the mixer is employed if the frequency of a desired channel falls within the lower half of the passband of the image reject filter. On the other hand, high-side injection of the LO signal into the mixer is employed if the frequency of a desired channel falls within the upper half of the passband of the image reject filter. By using this technique, the image always remains outside the passband of the image reject filter. Multiple image reject filters, each of which is used on only a portion of a multi-channel band, are unnecessary. The present invention permits the use of a single image reject filter having a passband wide enough to accommodate roughly double the number of channels that would ordinarily be possible using either low-side injection or high-side injection of the LO signal exclusively. In addition, design of the receiver's IF channel selection stage is simplified as a result of the low intermediate frequency.

DETAILED DESCRIPTION OF THE INVENTION

The present invention provides for a simple and inexpensive multi-channel superheterodyne receiver architecture that improves both channel selectivity and image rejection. This is accomplished by using a relatively low intermediate frequency (IF) and a novel approach to local oscillator (LO) frequency selection which causes image frequencies to fall outside the passband of a single, low-Q image reject filter. Any channel that falls within the passband of the image reject filter can be downconverted with image rejection if the bandwidth (BW) of the image reject filter is less than 4 times the IF. If the frequency of the desired channel falls within the lower half of the passband of the image reject filter, then low-side injection of the local oscillator (LO) signal into the mixer is employed. On the other hand, if the frequency of the desired channel falls within the upper half of the passband of the image reject filter, then high-side injection of the LO signal into the mixer is employed.

The invention will now be described with reference to drawing FIGS. 7 through 10. It should be understood that the drawings are not necessarily drawn to scale, and that the spectrographs are not meant to approximate the actual appearance of signals on a spectrum analyzer, but are merely representative thereof.

Figure 7:
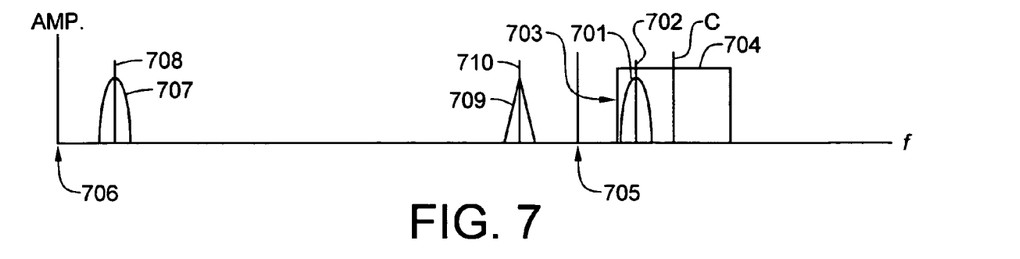
FIG. 7 is a plot of amplitude vs. frequency for a receiver employing both low-side and high-side injection of LO frequencies and which, in this case, applies low-side injection of the LO signal for the lowest frequency channel in the image reject filter bandwidth.

Referring now to FIG. 7, this plot of amplitude vs. frequency shows an instance of low-side injection of the local oscillator (LO) signal for the lowest frequency channel that falls within the image reject filter bandwidth. It will be noted that a first desired (i.e., selected) RF signal 701 having a first channel central frequency 702 is adjacent the left edge 703 of the passband 704 of the image reject filter. The passband 704 has a middle frequency C. It will also be noted that the frequency offset of a low-side-injected first LO signal 705 to the left, or low side of the first desired RF signal 701 has the same absolute value as the frequency offset from the origin 706 of a first downconverted signal 707 at the intermediate frequency (IF) 708 corresponding to, and containing substantially the identical intelligence as, the first desired RF signal 701. It will be further noted that a first undesired image signal 709 having a first image central frequency 710 has the same absolute value frequency offset to the left of the first LO signal 705 as the first desired RF signal 701 has to the right of the first LO signal 705.

Figure 8:
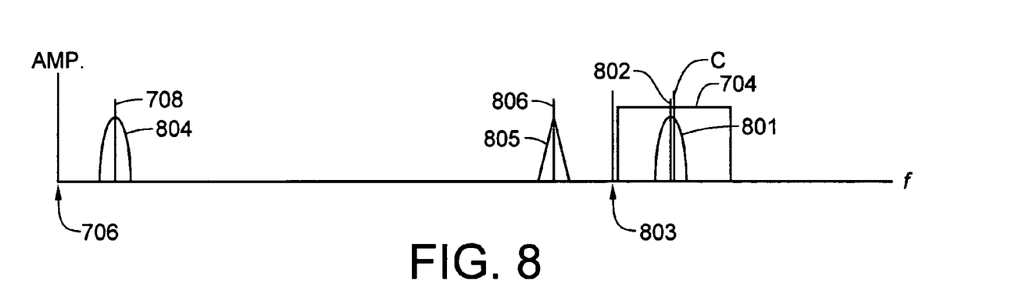
FIG. 8 is a plot of amplitude vs. frequency for a receiver employing both low-side and high-side injection of LO frequencies and which, in this case, applies low-side injection of the LO signal for a channel in the lower half and nearest the middle frequency of the image reject filter bandwidth.

Referring now to FIG. 8, this plot of amplitude vs. frequency shows an instance of low-side injection of the local oscillator (LO) signal for a channel in the lower half and nearest the center frequency of the image reject filter bandwidth. A second desired RF signal 801 has a second channel central frequency 802 that is just slightly offset to the left of the middle frequency C of the passband 704. It will be noted that the frequency offset of the low-side-injected second LO signal 803 to the left, or low side of the second desired RF signal 801 has the same absolute value as the frequency offset from the origin 706 of a second downconverted signal 804 at the intermediate frequency (IF) 708 corresponding to, and containing substantially the identical intelligence as, the second desired RF signal 801. It will also be noted that a second undesired image signal 805 having a second image central frequency 806 has the same absolute value frequency offset to the left of the second LO signal 803 as the second desired RF signal 801 has to the right of the second LO signal 803.

Figure 9:
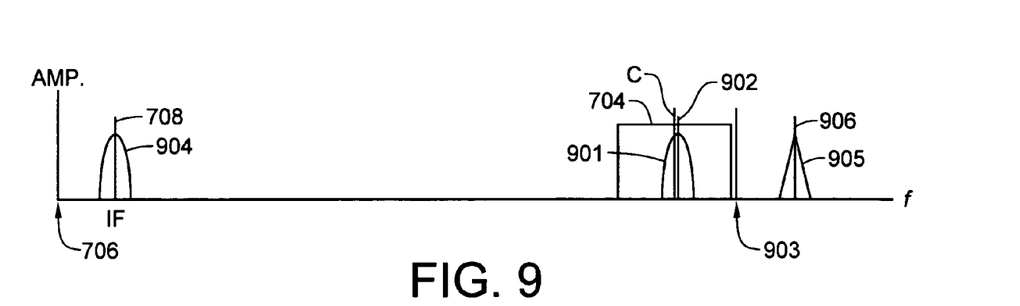
FIG. 9 is a plot of amplitude vs. frequency for a receiver employing both low-side and high-side injection of LO frequencies and which, in this case, applies high-side injection for a channel in the upper half and nearest the middle frequency of the image reject filter bandwidth.

Referring now to FIG. 9, this plot of amplitude vs. frequency shows an instance of high-side injection of the local oscillator (LO) signal for a channel in the upper half and nearest the middle frequency of the image reject filter bandwidth. A third desired RF signal 901 has a third channel central frequency 902 that is just slightly offset to the right of the middle frequency C of the passband 704. It will be noted that the frequency offset of the high-side-injected third LO signal 903 to the right, or high side of the third desired RF signal 901 has the same absolute value as the frequency offset from the origin 706 of a third downconverted signal 904 at the intermediate frequency (IF) 708 corresponding to, and containing substantially the identical intelligence as, the third desired RF signal 901. It will also be noted that a third undesired image signal 905 having a second image central frequency 906 has the same absolute value frequency offset to the right of the third LO signal 903 as the second desired RF signal 901 has to the left of the third LO signal 903.

Figure 10:
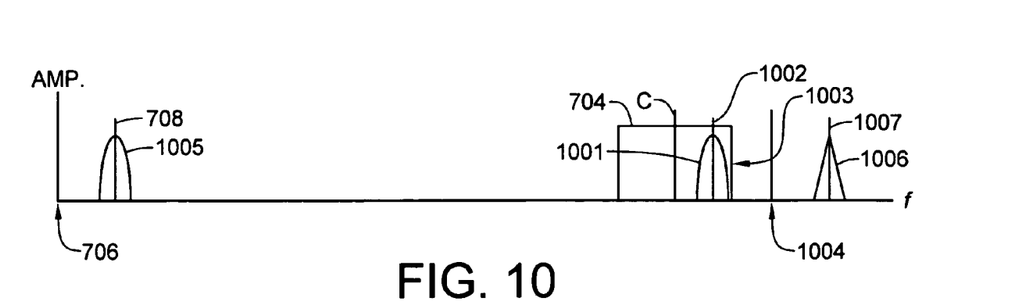
FIG. 10 is a plot of amplitude vs. frequency for a receiver employing both low-side and high-side injection of LO frequencies and which, in this case, applies high-side injection for the highest frequency channel in the image reject filter bandwidth.

Referring now to FIG. 10, this plot of amplitude vs. frequency shows an instance of high-side injection of the local oscillator (LO) signal for the highest frequency channel that falls within the image reject filter bandwidth. It will be noted that a fourth desired RF signal 1001 having a first channel central frequency 1002 is adjacent the right edge 1003 of the passband 704 of the image reject filter. It will also be noted that the frequency offset of the high-side-injected fourth LO signal 1004 to the right, or high side of the fourth desired RF signal 1001 has the same absolute value as the frequency offset from the origin 706 of a fourth downconverted signal 1005 at the intermediate frequency (IF) 708 corresponding to, and containing substantially the identical intelligence as, the fourth desired RF signal 1001. It will be further noted that a fourth undesired image signal 1006 having a first image central frequency 1007 has the same absolute value frequency offset to the right of the fourth LO signal 1004 as the fourth desired RF signal 1001 has to the left of the fourth LO signal 1004.

Figure 11:
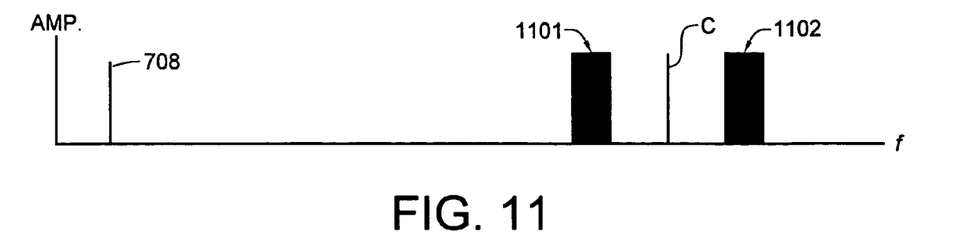
FIG. 11 is a plot of amplitude vs. frequency for a receiver employing both low-side and high-side injection of LO frequencies, and showing the discontinuous range of LO signals used for low-side and high-side injection.

Referring now to FIG. 11, this plot of amplitude vs. frequency for a receiver employing both low-side and high-side injection of LO frequencies shows the discontinuous range of LO signals used for both low-side and high-side injection. It will be noted that the low-side injection range of LO frequencies 1101 and the high-side injection range of LO frequencies 1102 are mirrored about the middle frequency C of the image reject filter bandwidth.

Figure 12:
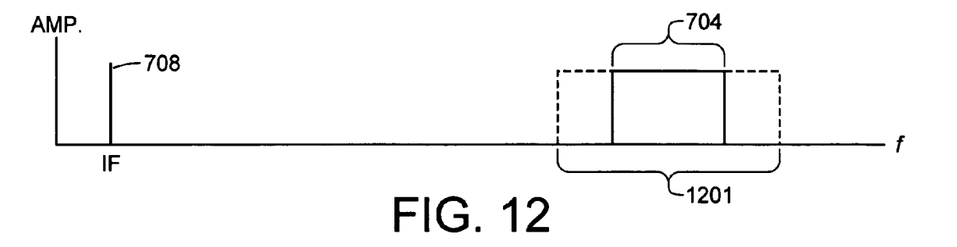
FIG. 12 is a plot of amplitude vs. frequency for a receiver employing both low-side and high-side injection of LO frequencies, and showing an image reject filter having the bandwidth of the examples depicted in FIGS. 7 through 10 compared with an image reject filter having the maximum possible bandwidth, that is still capable of providing full image rejection, at the same intermediate frequency.

Referring now to FIG. 12, this plot of amplitude vs. frequency for a receiver employing both low-side and high-side injection of LO frequencies shows both the passband 704 of the image reject filter of FIGS. 7 through 10 and the maximum width passband 1201 of an image reject filter, that is still capable of providing full image rejection at the same intermediate frequency.

Figure 13:
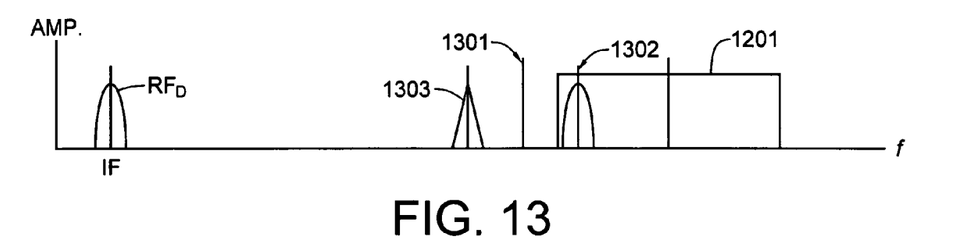
FIG. 13 is a plot of amplitude vs. frequency for a receiver employing both low-side and high-side injection of LO frequencies and having an image reject filter of the maximum bandwidth still capable of providing image rejection, and showing low-side injection of the LO signal for the lowest frequency channel in that maximum image reject filter bandwidth.

Referring now to FIG. 13, this plot of amplitude vs. frequency for a receiver employing both low-side and high-side injection of LO frequencies shows the case of low-side injection of a LO signal 1301 for the lowest frequency channel 1302 in the maximum image reject filter passband 1201 of FIG. 12. In this example, there is clearly no problem with rejecting the image signal 1303.

Figure 14:
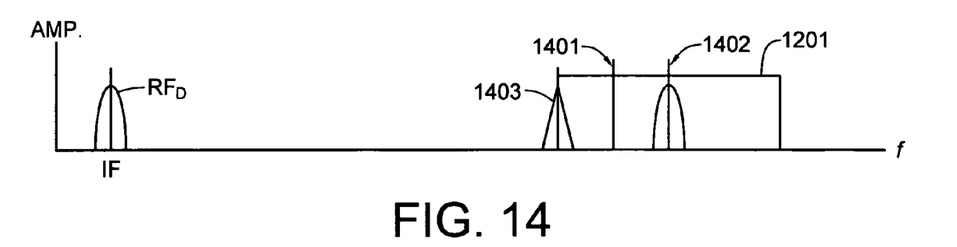
FIG. 14 is a plot of amplitude vs. frequency for a receiver employing both low-side and high-side injection of LO frequencies and having an image reject filter of the maximum bandwidth still capable of providing image rejection, and showing low-side injection of the LO signal for a channel at the middle frequency in that maximum image reject filter bandwidth.

Referring now to FIG. 14, this plot of amplitude vs. frequency for a receiver employing both low-side and high-side injection of LO frequencies shows the case of low-side injection of a LO signal 1401 for a channel at the middle frequency 1402 in the maximum image reject filter bandwidth 1201. In this example, it will be noted that fully half of the image signal 1403 encroaches on the left side 1404 of the image reject filter passband 1201. It should be quite clear from this example that the absolute limit of image reject filter bandwidth, using both low-side and high-side injection, is 4 times the IF, and that would be true only if channel bandwidth were zero. As channel bandwidth is never zero, the practical limit will be somewhat less than 4 times the IF. In fact, the bandwidth of the image reject filter must be no greater than 4 times the intermediate frequency minus the bandwidth of a channel at midpoint in the image reject filter passband. In any case, the present invention effectively doubles the possible image reject filter bandwidth for a single down-conversion stage superheterodyne radio receiver. That doubling of image reject filter bandwidth permits a doubling of the number of channels available in the same radio receiver.

Through the use of both low-side injection and high-side injection in the downconversion/mixing process, unnecessary complexity and cost in the design and manufacture of superheterodyne radio receivers can be minimized. In addition, the invention can even be used in dual-down-conversion superheterodyne receivers by employing both low-side injection and high-side injection of a LO signal at one or both stages, thereby further enhancing both channel selectivity and image rejection capability of that type of receiver. Multiple image reject filters, each of which is used on only a portion of a multi-channel band, are unnecessary. The present invention permits the use of a single image reject filter having a passband wide enough to accommodate roughly double the number of channels that would ordinarily be possible using either low-side injection exclusively, or high-side injection exclusively, of the LO signal. The present invention has been applied to the manufacture of receivers having a single image reject filter and as many as 50 channels. The maximum number of channels will, of course, be dependent on the channel bandwidth. In addition, design of the receiver's IF channel selection stage is simplified as a result of the low intermediate frequency.

For a presently preferred embodiment receiver or transceiver incorporating the invention, a surface-acoustic wave filter is used for the image reject filter. Other types of filters, which are commonly known in the art, and which may be obtained from a variety of component suppliers and manufacturers, may also be used to implement the invention. Referring once again to FIG. 2, the image reject filter is incorporated in the radio frequency amplifier stage 202.

Figure 15:
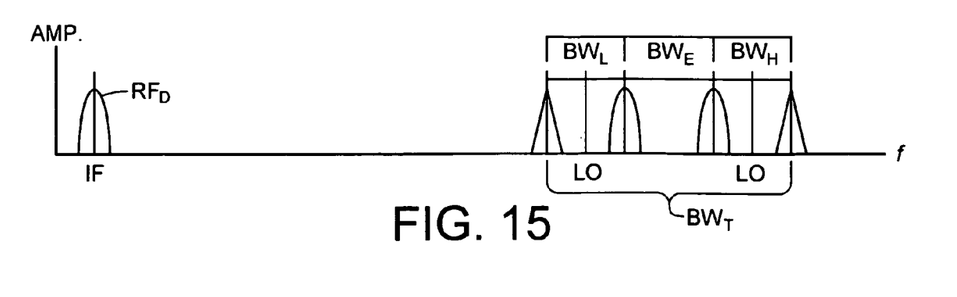
FIG. 15 is a plot of amplitude vs. frequency for a receiver employing both low-side and high-side injection of LO frequencies and having an image reject filter with a passband that is considerably wider than four times the IF.

One of the problems associated with the use of "off-the-shelf" integrated circuitry components is that they are almost never perfectly tailored for the application. For example, it is unlikely that an image reject filter, having precisely the desired passband frequency range, can be selected from existing "off-the-shelf" components. Although it might be possible to use an "off-the-self" filter having considerably less than 4 times the IF, this would unduly restrict the number of channels that could be accommodated by a single downconversion stage. The problem can be solved simply by using an image reject filter having a passband that is considerably greater than 4 times the IF. Utilization of such a filter is demonstrated by the graph of FIG. 15. The "off-the-shelf" image reject filter has a passband $PB_T$ that is considerably greater than 4 times the intermediate frequency (IF) of the receiver. The filter may be used effectively to implement the present invention by using only the low and high-frequency end portions $PB_L$ and $PB_H$, respectively, of the existing passband $PB_T$, thereby excluding a center portion thereof. The approximate bandwidth of the excluded portion $PB_E$ may be calculated by the following formula: $PB_E=PB_F-4IF$, where $PB_F$ is the total bandwidth of the filter and IF is the intermediate frequency of the receiver. The total bandwidth of the used portion of the filter passband is still 4 times the IF, and the bandwidth of each utilized end portion ($PB_L$ or $PB_H$) is about 2 times the IF. Spectrum RF1 represents the upper channel frequency limit within the lower end portion $PB_L$. At this point, the image I1 is beginning to encroach on the low-frequency edge of the image reject filter passband $PB_T$. Likewise, spectrum RF2 represents the lower channel frequency limit within the upper end portion $PB_H$. At this point, the image I2 is beginning to encroach on the high-frequency edge of the image reject filter passband $PB_T$. As a consequence of using the foregoing scheme, only channels within a lower frequency portion and channels within an upper frequency portion of a broadcast band are utilized. It should be clear that the used portion of the passband will be either continuous if the entire passband is used, or discontinuous if a center portion is excluded from use.

Although only a single embodiment of the invention has been disclosed herein, it will be obvious to those having ordinary skill in the art of radio receiver design that changes and modifications may be made thereto without departing from the scope of the invention as hereinafter claimed. For example, although the invention has been described in terms of receivers, the invention is equally applicable to the receiver circuitry of transceivers. In addition, although the disclosure mentions the use of a single image reject filter with a single downconversion stage, it should also be clear that the term "filter" should be interpreted broadly so that it includes multiple, serially-coupled filters in a single filter stage. In such a case, the multiple filters will function, in concert, as a single filter. The single filter stage comprises specialized circuitry which may incorporate components which are both linear and passive, such as resistors, capacitors and inductors, components which are both non-linear and active, such as transistors, diodes and other semiconductor components, or components selected from both groups. In any case, the image rejection circuitry must have a passband that is both sufficiently wide to pass a desired signal received on any of multiple channels within a broadcast band, and sufficiently narrow to reject undesired frequencies, including images associated with the desired signals. It should also be clear that where a single local oscillator may be used to generate local oscillator signals over a full range of frequencies, multiple oscillators may also be used, wherein each individual oscillator would be used to generate only a portion of the full range of frequencies. It should further be clear that the invention may be incorporated in a receiver or transceiver having multiple downconversion stages, whereby at least one of the stages would incorporate a single image reject filter or image reject filter stage.

What is claimed is:

1. A superheterodyne radio receiver comprising:
   at least one local oscillator for generating a local oscillator signal over a range of frequencies;
   a mixer stage in which a RF signal received at a selected frequency is mixed with a local oscillator signal at a corresponding frequency to downconvert the received RF signal to an intermediate frequency signal containing substantially identical intelligence as the received RF signal, said mixer stage employing low-side injection if the selected RF signal falls generally within a lower half of the passband, and high-side injection if the selected RF signal falls generally within an upper half of the passband; and
   image rejection circuitry employing a passband with a used portion that is about four times the fixed intermediate frequency, said used portion passing a desired signal received on any of multiple channels within a broadcast band, but rejecting an image signal at an unselected frequency that is associated with the desired signal due to sideband ambiguity inherent in the signal mixing process, which image signal would otherwise be converted to an interfering signal at the same intermediate frequency.

2. The radio receiver of claim 1, wherein said oscillator generates a discontinuous range of frequencies has a gap where a transition is made by the mixer from low-side injection to high-side injection.

3. The radio receiver of claim 1, wherein each RF signal is received on a channel of known frequency bandwidth, and the passband of said image rejection circuitry is of sufficient width to pass up to double a number of signals received on multiple channels as would be possible using a similar receiver having the same image rejection circuitry, and which employs LO injection on only one side of a received signal.

4. The superheterodyne radio receiver of claim 1, wherein said image rejection circuitry has both low-pass and high-pass components combined into a single bandpass filter stage.

5. A superheterodyne radio receiver capable of receiving multiple channels within a broadcast band, said receiver comprising:
   at least one local oscillator for generating a local oscillator signal over a range of frequencies;
   a mixer for mixing a signal received on a selected one of the multiple channels with a local oscillator signal of appropriate frequency, thereby producing a beat frequency signal containing substantially identical intelligence as the received signal, at a fixed intermediate frequency, said mixer employing a local oscillator signal that is lower in frequency than the received signal for channels falling generally within the lower half of the passband, and employing a local oscillator signal that is higher in frequency than the received signal for channels falling generally within the upper half of the passband; and image resection circuitry employing a passband with a used portion that is about four times the fixed intermediate frequency, said used portion passing a desired signal received on any of multiple channels within a broadcast band, but reiectinq an image signal at an unselected frequency that is associated with the desired signal due to sideband ambiguity inherent in the signal mixing process, which image signal would otherwise be converted to an interfering signal at the same intermediate frequency.

6. The superheterodyne radio receiver of claim 5, wherein said range of frequencies is discontinuous, having a gap in about a middle of the range.

7. The superheterodyne radio receiver of claim 5, wherein the passband of said image rejection circuitry is of sufficient width to pass double a number of signals received on multiple channels as would be possible using a similar receiver which employs LO injection on only one side of a received signal.

8. The superheterodyne radio receiver of claim 5, wherein said image rejection circuitry has both low-pass and high-pass components combined into a single bandpass filter stage.

9. A radio receiver comprising:
at least one local oscillator for generating a local oscillator signal over a range of frequencies; and
a mixer for downconverting a signal received on said selected one of said channels to a corresponding signal, containing substantially the same intelligence, at an intermediate frequency that is fixed for the radio receiver, by mixing the received signal with a local oscillator signal of appropriate frequency, said mixer employing low-side injection of the local oscillator signal for channels falling generally within the lower half of the passband, and employing high-side injection for channels falling generally within the upper half of the passband; and
image rejection circuitry employing a passband with a used portion that is about four times the fixed intermediate frequency, said used portion passing a desired signal received on any of multiple channels within a broadcast band, but rejecting an image signal at an unselected frequency that is associated with the desired signal due to sideband ambiguity inherent in the signal mixing process, which image signal would otherwise be converted to an interfering signal at the same intermediate frequency.

10. The radio receiver of claim 9, wherein said range of frequencies is discontinuous and has a gap where a transition is made by the mixer from low-side injection to high-side injection.

11. The radio receiver of claim 9, wherein each desired signal is received on a channel of known frequency bandwidth, and the passband of said image rejection circuitry is of sufficient width to pass up to double a number of signals received on multiple channels as would be possible using a similar receiver having the same image rejection circuitry, and which employs LO injection on only one side of a received signal.

12. The superheterodyne radio receiver of claim 9, wherein said image rejection circuitry has both low-pass and high-pass components combined into a single bandpass filter stage.

13. A superheterodyne radio receiver comprising:
at least one down-conversion stage having
a local oscillator signal source;
a mixer in which a RF signal received at a selected frequency is mixed with a corresponding local oscillator signal to downconvert the received RF signal to an intermediate frequency signal, said mixer employing low-side injection if the selected RF signal falls generally within a lower half of the passband, and high-side injection if the selected RF signal that falls generally within an upper half of the passband; and
image rejection circuitry employing a passband with a used portion that is about four times the fixed intermediate frequency, said used portion passing a desired signal received on any of multiple channels within a broadcast band, but rejecting an image signal at an unselected frequency that is associated with the desired signal due to sideband ambiguity inherent in the signal mixing process, which image signal would otherwise be converted to an interfering signal at the same intermediate frequency.

14. The radio receiver of claim 13 wherein said oscillator generates a discontinuous range of frequencies has a gap where a transition is made by the mixer from low-side injection to high-side injection.

15. The radio receiver of claim 13, wherein each RF signal is received on a channel of known frequency bandwidth, and the passband of said image rejection circuitry is of sufficient width to pass double a number of signals received on multiple channels as would be possible using a similar receiver having the same image rejection circuitry, and which employs LO injection on only one side of a received signal.

16. The superheterodyne radio receiver of claim 13, wherein said image rejection circuitry has both low-pass and high-pass components combined into a single bandpass filter stage.

* * * * *